United States Patent
Taylor et al.

(10) Patent No.: US 6,760,145 B1
(45) Date of Patent: Jul. 6, 2004

(54) ACTUATOR FOR DUAL-AXIS ROTATION MICROMIRROR

(75) Inventors: William P. Taylor, North Andover, MA (US); John D. Brazzle, Milford, NH (US); Jonathan J. Bernstein, Medfield, MA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/349,860

(22) Filed: Jan. 23, 2003

(51) Int. Cl.$^7$ ................................................ G02B 26/00
(52) U.S. Cl. ...................... 359/290; 359/291; 359/221; 359/224; 359/281
(58) Field of Search ................................. 359/290, 291, 359/298, 224, 221, 281, 230, 280

(56) References Cited

U.S. PATENT DOCUMENTS

| | | | |
|---|---|---|---|
| 5,606,447 A | | 2/1997 | Asada et al. |
| 5,767,666 A | | 6/1998 | Asada et al. |
| 5,912,608 A | | 6/1999 | Asada |
| 5,966,009 A | | 10/1999 | Asada |
| 6,044,705 A | | 4/2000 | Neukermans et al. |
| 6,097,859 A | | 8/2000 | Solgaard et al. |
| 6,181,460 B1 | * | 1/2001 | Tran et al. .................. 359/291 |
| 6,201,629 B1 | * | 3/2001 | McClelland et al. ......... 359/223 |
| 6,334,573 B1 | * | 1/2002 | Li et al. ................ 235/462.32 |
| 6,392,220 B1 | * | 5/2002 | Slater et al. ................ 250/216 |
| 2002/0050744 A1 | | 5/2002 | Bernstein et al. |
| 2002/0130561 A1 | | 9/2002 | Temesvary et al. |

FOREIGN PATENT DOCUMENTS

WO    WO 00/13210    3/2000

OTHER PUBLICATIONS

U.S. patent application Ser. No. 10/085,963, Bernstein et al., filed Feb. 28, 2002.

* cited by examiner

Primary Examiner—Hung Xuan Dang
Assistant Examiner—Tuyen Tra
(74) Attorney, Agent, or Firm—Joanne N. Pappas

(57) ABSTRACT

An array of movable MEMS mirror devices is provided being electromagnetically actuated in one axis and using an additional set of coils, or a single coil, positioned off of the main axis of rotation to achieve a second axis of rotation while allowing for a very high linear mirror fill factor (>80%). This second set of coils, or second electrically wired coil, is capable of generating the necessary torque about an axis that is perpendicular to the major axis of rotation. A second embodiment is provided using electromagnetic actuation in one axis of rotation, which typically has larger rotation angles than the second axis, and electrostatic actuation in the second axis of rotation. Electrostatic pads can be used to sense rotation. When staggering adjacent pixels a center array of mirrors with no coils or electrodes provides increased radius of curvature and reducing undesirable cross-talk between adjacent mirror devices.

61 Claims, 14 Drawing Sheets

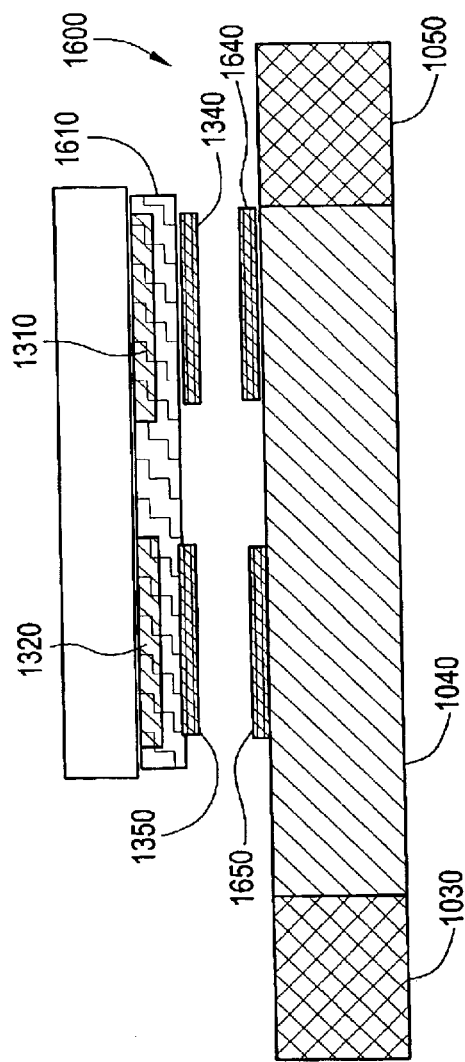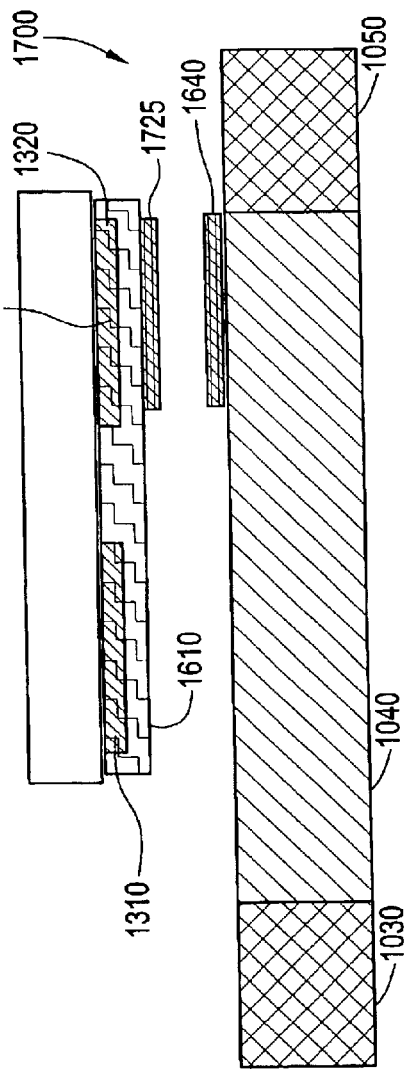

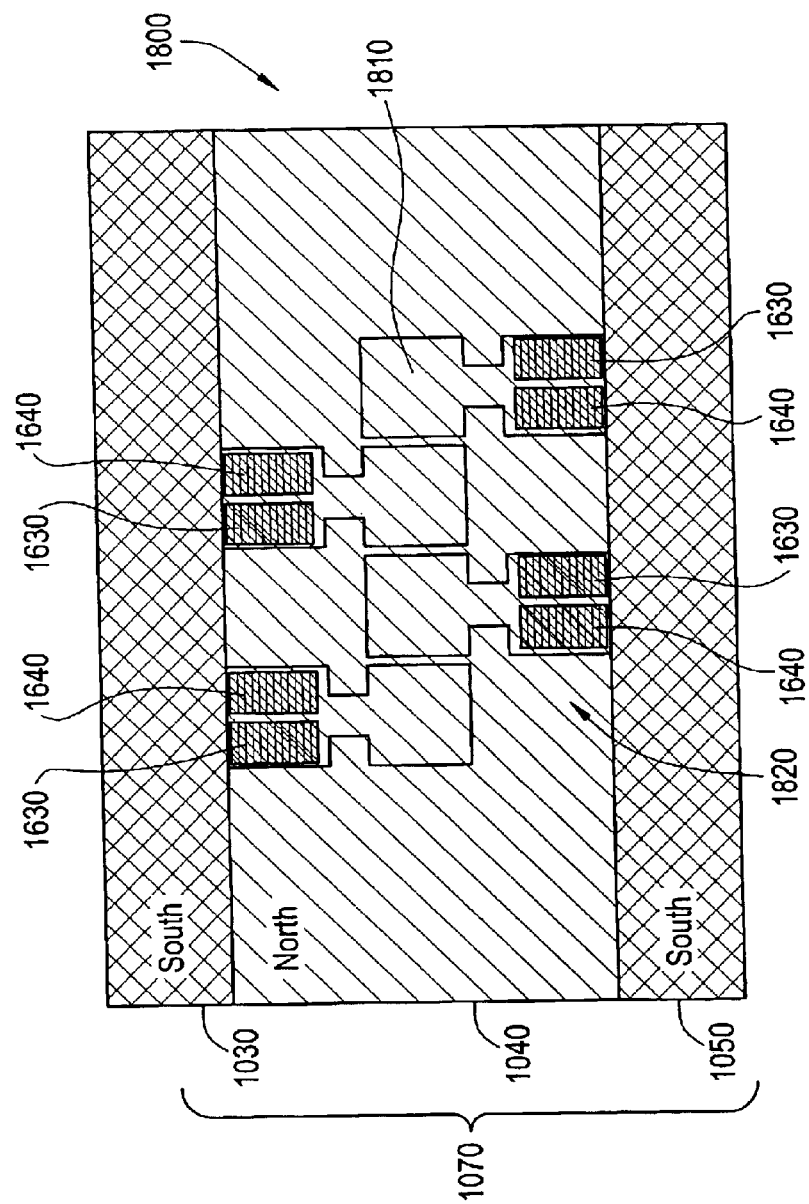

ACTUATOR FOR DUAL-AXIS ROTATION MICROMIRROR

FIELD OF THE INVENTION

This invention relates generally to microelectromechanical (MEMS) devices and, more particularly, to MEMS devices having movable mirrors used, e.g., in optical switches, scanners, projectors, etc.

BACKGROUND OF THE INVENTION

Optical switches may be used for routing optical signals in fiber optic networks. The switches may selectively transmit light signals from a set of input fibers to a set of output fibers. The switches may include at least one array of movable mirrors or reflectors that can be selectively actuated to deflect light signals to particular output fibers. The movable mirrors can be actuated or controlled in a variety of ways including electromagnetic actuation, electrostatic actuation, piezoelectric actuation, or thermal bimorph. Fabrication of the mirror arrays has been attempted using MEMS technology, in which silicon processing and related techniques common to the semiconductor industry are used to form microelectromechanical devices.

In many applications for optical micromirrors, it is desirable to build an array of mirrors with both a high fill factor and control of two axes of rotation. Advantages of increased linear mirror fill factor include improved channel shape in wavelength division multiplexing systems and reduced optical loss. Advantages of having two axes of rotation over only one axis include the ability to more ably move the mirror in different directions, for example to steer an optical beam to hit or avoid a particular optical fiber.

For purposes of the instant invention, linear fill-factor as a term of art is defined as the size of the mirror in one direction divided by the pitch of the mirror array in the same direction.

One technique known in the prior art for achieving two axes of rotation has a mirror with a gimbals structure. This solution however, generally limits the fill factor achievable due to the area taken up by the gimbals.

A need exists for building an array of mirrors achieving both a high fill factor and control of two axes of rotation.

A need exists for obtaining fill factors in excess of 80%.

SUMMARY OF THE INVENTION

One aspect of the invention is a mirror device for obtaining dual axis rotation including a first means for electromagnetic actuation about a first axis; and a second means for actuation about a second axis where the first and second means for actuation do not utilize a gimbal structure. The first means for electromagnetic actuation utilizes at least one first coil. In another aspect of the invention, the second means for actuation is electromagnetic actuation utilizing at least one second coil. In another aspect of the invention, the at least one first coil and the at least one second coil can be positioned anywhere relative to each other on any side of the first and second axes. And in another aspect of the invention, the at least one first means coil is positioned only on one side of the first axis. Additionally, the at least one second means coil is positioned on the same side of the first axis as the at least one first means coil. And in another aspect of the invention, only the at least one second coil is present.

In yet another aspect of the invention, at least one permanent magnet provides a magnetic field to actuate the coils. Yet still another aspect of the invention includes an array formed of mirror devices with the first and second means for electromagnetic actuation providing a linear fill factor greater than 80%. Further aspects include an array of magnets of alternating polarity arranged to provide a magnetic field for the array of mirror devices and an array of center mirrors of the mirror device array having no coils.

In another aspect of the invention, the second means for actuation is electrostatic actuation utilizing at least one electrode. In yet another aspect of the invention, the at least one first coil and the at least one electrode can be positioned anywhere relative to each other on either side of the first and second axes. In a different aspect, the at least one electrode is positioned only on one side of the first axis. Additionally, the at least one coil is positioned on the same side of the first axis as the at least one electrode. And in another aspect of the invention, the at least one electrode is positioned only on one side of the second axis. Further aspects include the second means for electrostatic actuation utilizing a common ground plane, an interposer or at least one patterned electrode. Still further aspects include at least one permanent magnet providing a magnetic field to actuate the coils. In other aspects, an array formed of the mirror devices with the first and second means for actuation provides a linear fill factor greater than 80% and an array of magnets of alternating polarity is arranged to provide a magnetic field for the array of the mirror devices and wherein an array of center mirrors of said mirror device array includes no coils or electrodes.

In yet another aspect of the invention, the mirror device has a double paddle structure. And in still further aspects, the at least one electrode is used to sense rotation about at least one of the axes, a plurality of electrodes are used to measure differential capacitance for second axis rotation, or a plurality of electrodes on an interposer are used to measure differential capacitance for second axis rotation.

In another aspect of the present invention, a mirror device for obtaining dual axis rotation includes a first means for electromagnetic actuation about a first axis and a second means, coupled to the first axis, for electrostatic actuation about a second axis. In further aspects, the first means for electromagnetic actuation utilizes at least one coil and at least one permanent magnet provides a magnetic field to actuate the at least one coil. Other aspects include, the second means for electrostatic actuation utilizes at least one electrode, a common ground plane, an interposer, and/or at least one patterned electrode. Still further aspects include an array of devices with the first means for electromagnetic actuation and the second means for electrostatic actuation allowing for a linear fill factor greater than 80% and wherein an array of magnets of alternating polarity are arranged to provide a magnetic field for the mirror device array. In another aspect, an array of center mirrors of the mirror device array has no coils or electrodes. In yet another aspect of the invention, this mirror device has a double paddle structure. In still further aspects of the invention, the at least one electrode is used to sense rotation about at least one of the axes, a plurality of electrodes are used to measure differential capacitance for second axis rotation, or a plurality of electrodes on the interposer are used to measure differential capacitance for second axis rotation.

In still yet another aspect of the invention, an array of MEMS devices, where each device includes a mirror with a reflective surface having no gimbal support, at least one first coil for causing selective movement of the mirror about a first axis in the presence of a magnetic field, and means for causing selective movement of the mirror about a second axis. Further aspects include the means for causing selective movement utilizing at least one second coil in the presence of a magnetic field, the at least one first coil positioned in any position on each side of the first axis, the at least one first coil positioned only on one side of the first axis, the at least one second coil positioned in any position on each side of the second axis, the at least one first and second coils are superposed on the mirror, and/or the at least one first and second coils are not superposed on the mirror. Still further aspects include the array of devices allowing a linear fill factor greater than 80%, an array of magnets of alternating polarity arranged to provide the magnetic field for the array, and/or a center mirror array having no coils. In still further aspects of the invention, the second means for causing selective movement utilizes at least one electrode and the at least one coil and the at least one electrode can be in any position relative to each other on either side of the first and second axes. Also the at least one electrode may be positioned only on one side of the first axis, on one side of the second axis, and/or the at least one coil is positioned on the same said of the first axis as the at least one electrode. Additionally, the means for causing selective movement may utilize a common ground plane, an interposer, and/or at least one patterned electrode. Still further aspects include the array of devices allowing a linear fill factor greater than 80%, an array of magnets of alternating polarity arranged to provide the magnetic field for the array, and/or a center mirror array having no coils or electrodes. Further aspects include the at least one electrode may be used to sense rotation about at least one of the axes, a plurality of electrodes are used to measure differential capacitance for the second axis movement. Another aspect of the invention is that the mirror device has a double paddle structure.

In a further aspect of the present invention, an array of electromagnetically actuated MEMS devices is provided wherein each device includes a mirror with a reflective surface having no gimbal structure support, and at least one minor axis coil for causing selective movement of the mirror about the minor axis in the presence of a magnetic field. In still further aspects of the invention the minor axis coil produces dual axis rotation of the mirror and the array of mirror devices allows a linear fill factor greater than 80%.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

This invention is further illustrated with reference to the following drawings in which:

FIG. 16 is a side view of FIG. 13 of mirror pixel device having electromagnetic major axis actuation and electrostatic minor axis actuation in accordance with a preferred embodiment of the present invention.

FIG. 17 is a side of FIG. 15 with only one side of electrostatic minor axis actuation in accordance with a preferred embodiment of the present invention.

FIG. 18 is a top view of mirror pixels with only one side of electrostatic minor axis actuation over a magnet array in accordance with a preferred embodiment of the present invention.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

The use of an array of micromirrors such as MEMS mirror devices with high fill-factor may be advantageous for certain optical systems. One example of such a system would be a photonic switch or a photonic switching mirror array or a multiple wavelength optical switch. In this type of application, the incoming light from an optical fiber is sent through a diffraction grating. This would result in beams of light at different wavelengths. Different wavelengths represent different channels to be used for information transfer. Hence, a MEMS mirror array could be used to switch the incoming light to one of several output states, which may be another optical fiber, or a blocking state. This blocking state may also be referred to as a "black" state. Each channel would have its own respective mirror to direct the light of that wavelength from an input to a given output state.

Figure 1:
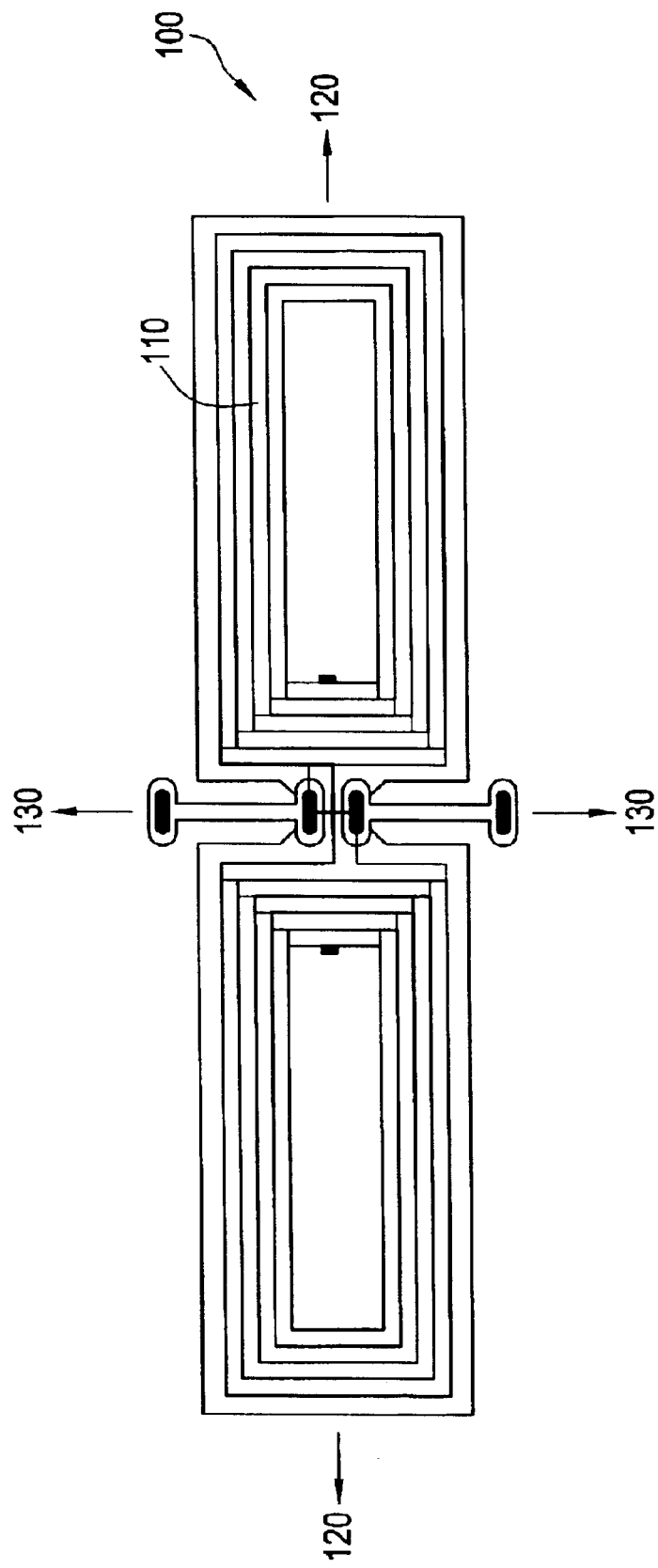
FIG. 1 is a top view of a MEMS mirror pixel with coils for rotation about a single axis.

Referring now to FIG. 1, as an example, a single channel MEMS mirror pixel 100 which could be used for rotation about a single axis having coils 110 is shown. A permanent magnet or set of magnets (not shown in FIG. 1) provides a strong magnetic field, which exerts a torque on the pixel as current is passed through the coils. The mirror may be fabricated by depositing a reflective surface on the back side (not shown) of the MEMS mirror pixel 100.

Methods of manufacturing such mirror pixels are described in pending U.S. patent application, filed on Aug. 24, 2001, Ser. No. 09/939,422, Publication Number US20020050744 A1, entitled MAGNETICALLY ACTUATED MICRO-ELECTRO-MECHANICAL APPARATUS AND METHOD OF MANUFACTURE, assigned to Corning IntelliSense Corporation, a wholly-owned subsidiary of Assignee hereof, Corning Incorporated and incorporated by reference herein.

In such an optical system, it would be desirable to have a high linear fill-factor mirror array of mirror pixels 100. High linear fill-factor can be defined as the length of the mirror along an axis divided by the pitch between adjacent mirror pixels. The geometry of the layout with high fill factor would capture more of the light from the diffraction grating at each channel.

High fill factor solutions are described in pending U.S. patent application, filed on Feb. 28, 2002, Ser. No. 10/085,963, entitled MICROELECTROMECHANICAL MIRROR DEVICES HAVING A HIGH LINEAR FILL FACTOR, assigned to Corning IntelliSense Corporation, a wholly-owned subsidiary of Assignee hereof, Corning Incorporated and incorporated by reference herein.

The light is incident on such a mirror array (not shown) from a diffraction grating, and may also pass through several optical components such as, but not limited to, a lens or lens array. Each wavelength or beam is deflected along the direction of a minor axis 120 to each individual mirror. The major axis 130 is the major axis of rotation, or the x-axis in this case. Deflection about a minor axis 120, substantially orthogonal to the major axis, can be used to move beams around an input or output between switching states to prevent unwanted signal transmission or to compensate for minor non-planarities of the MEMS mirror array. An additional advantage of the minor axis rotation is that cross-talk during switching can virtually be eliminated. By actuating the minor axis during switching, the input beams can be decoupled from the non-selected output channels. Each mirror is capable of being actuated to and remaining at a given angle via a control system.

Figure 2:
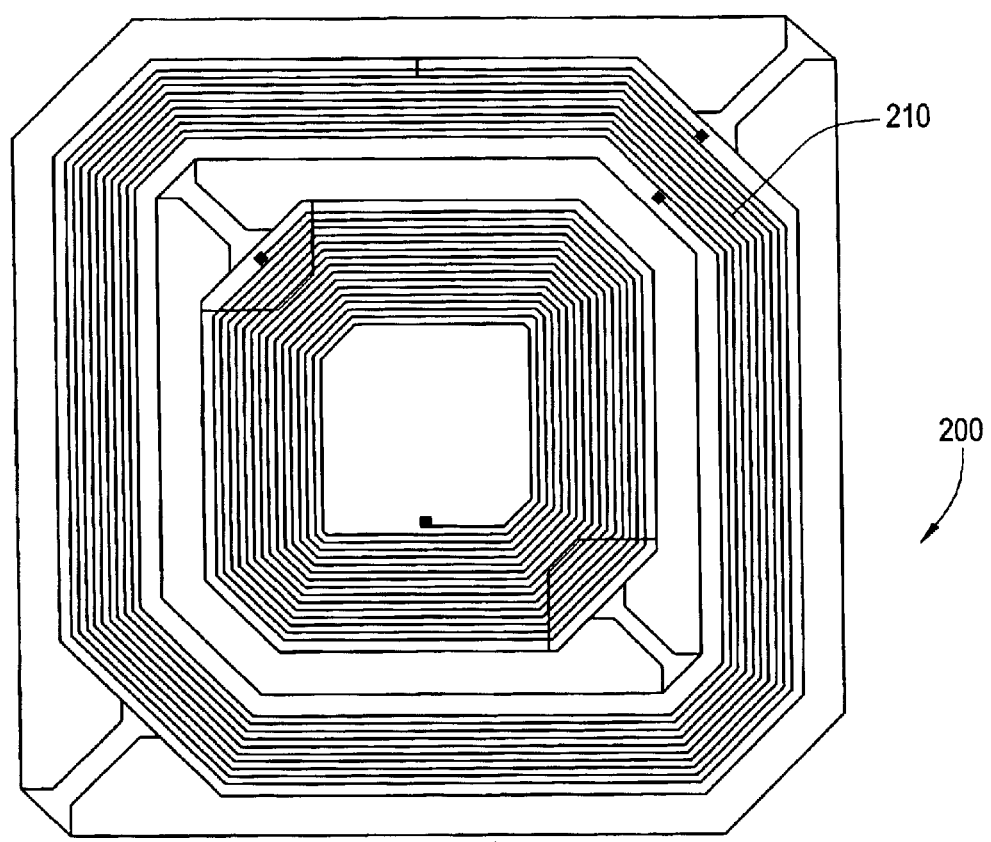
FIG. 2 is a top view of a gimbals structure for two-axis rotation.

Versions of mirrors that rotate in two axes have used a gimbals structure 200, as discussed supra, as described in conjunction with pending U.S. patent application, filed on Aug. 24, 2001, Ser. No. 09/939,422 (cited supra), and as shown for instance in FIG. 2. The use of the gimbals 210 greatly reduces the possible linear fill factor as mirror "real estate" is minimized since the gimbal 210 itself takes area away from mirror to be used. The preferred embodiments of the present invention are advantageous as a result of the gimbals structure being eliminated from the mirror pixel as will be described in more detail infra.

Figure 3:
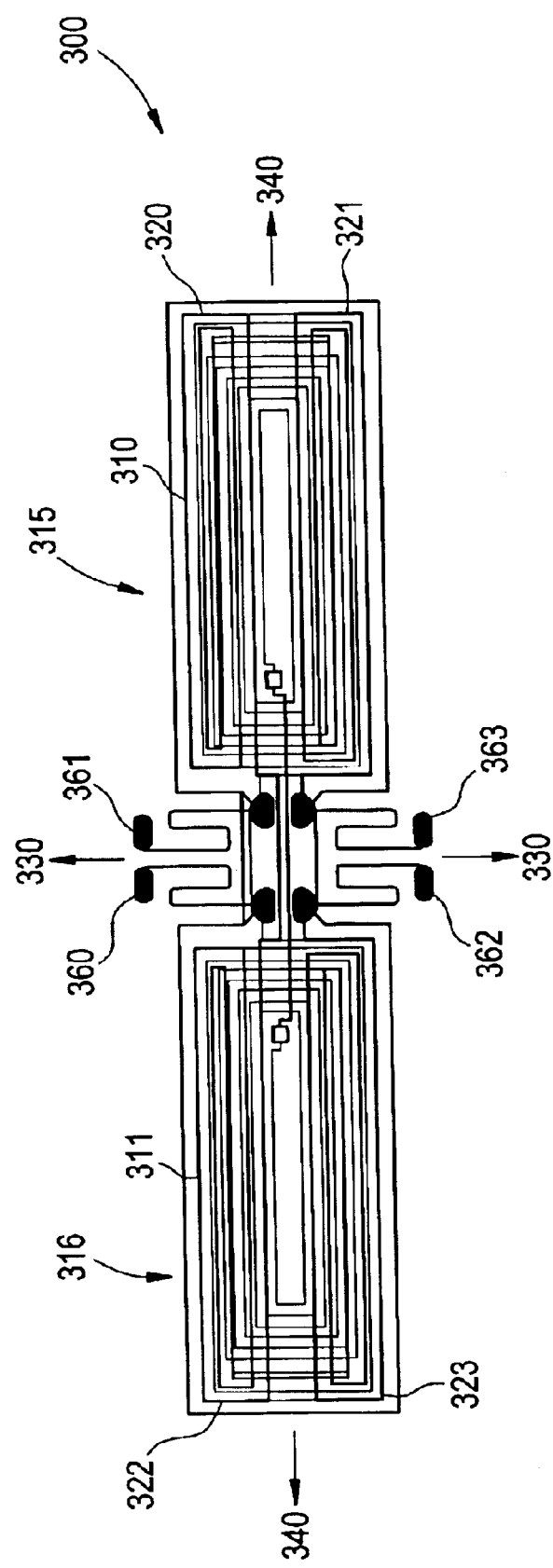
FIG. 3 is a top view of a MEMS mirror pixel with coils for rotation about two axes in accordance with a preferred embodiment of the present invention.
Figure 4:
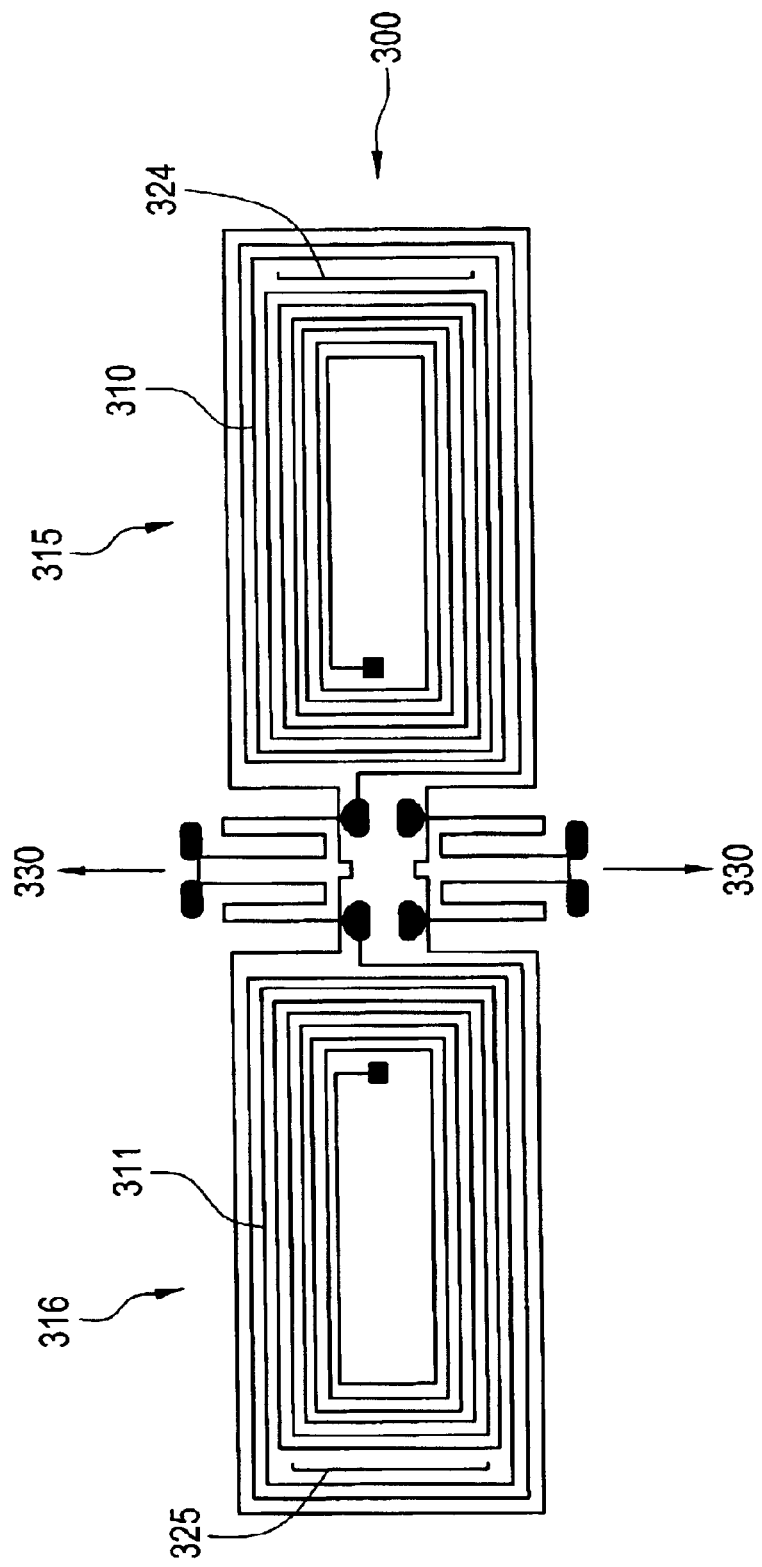
FIG. 4 is a top view of FIG. 3 showing major axis coils in accordance with a preferred embodiment of the present invention.
Figure 5:
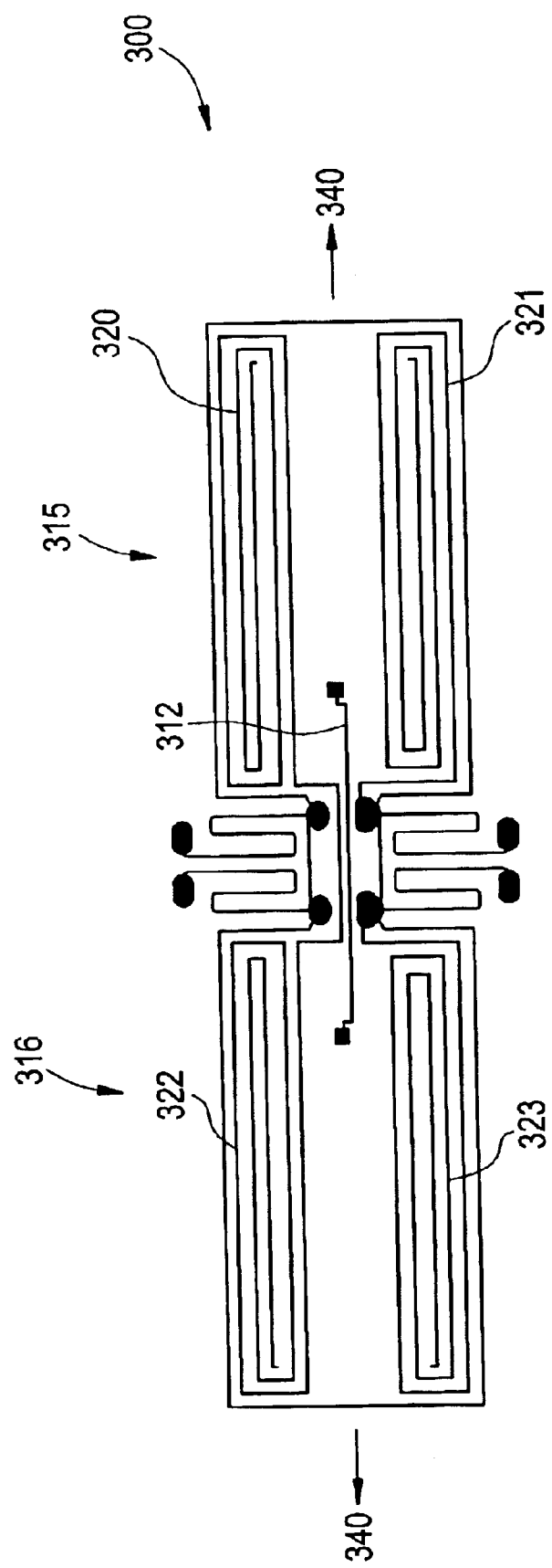
FIG. 5 is a top view of FIG. 3 showing minor axis coils in accordance with a preferred embodiment of the present invention.

Referring now to FIGS. 3–5 a dual-axis mirror pixel designed to operate without the use of a gimbals structure is provided in accordance with preferred embodiments of the present invention. In effect, FIGS. 4 and 5 are provided for clarity, as combined they produce the preferred embodiment shown in FIG. 3. Hence, several of the elements of FIG. 3 are found in FIGS. 4 and 5. By and large, in these embodiments, there are four flexures 360–363 in FIG. 3 that are used to create the electrical connections to the four ends of the coils on the mirror. Multiple coils may be wired in series or parallel on the mirror to achieve the desired rotation in either the major or minor rotational axis.

Referring now to FIG. 3 a mirror pixel 300 having two coils 310 and 311 on each side of the major rotational axis 330 is shown for providing torque about the major axis 330 of rotation. The mirror pixel 300 is shown to include two paddles 315 and 316, each paddle containing one major axis coil. Viewed from the top, the paddle 315 on the right side of the major rotational axis 330 contains coil 310. The paddle 316 on the left side of the major rotational axis 330 contains coil 311. The mirror may be fabricated by depositing a reflective surface on the backside of one or both paddles 315 and 316.

In mirror pixel 300, the torque for the minor axis 340 is provided by four additional coils 320–323, also shown in FIG. 5, two on each side of the major and minor rotational axes 330 and 340 respectively, which when energized act to push and pull away from a set of permanent magnets (not shown) which would be located under the pixel 300 in accordance with one aspect of the preferred embodiment of the present invention.

Referring to FIG. 4, the mirror pixel 300 is provided containing coils 310 and 311, associated with the major axis 330 of rotation in accordance with a preferred embodiment of the present invention. Also shown in FIG. 4 are crossunders 324 and 325 utilized to connect coils 320–321 and 322–323 as shown in FIG. 5. Referring to FIG. 5, the coils 320–323 for the minor axis 340 rotation are provided in accordance with a preferred embodiment of the present invention. Also shown in FIG. 5 a cross-over 312 that is utilized to connect coils 310 and 311 as shown in FIG. 4.

In accordance with the preferred embodiments of the present invention, the required minor axis 340 rotation may be small when compared to the major axis 330 rotation.

Figure 6:
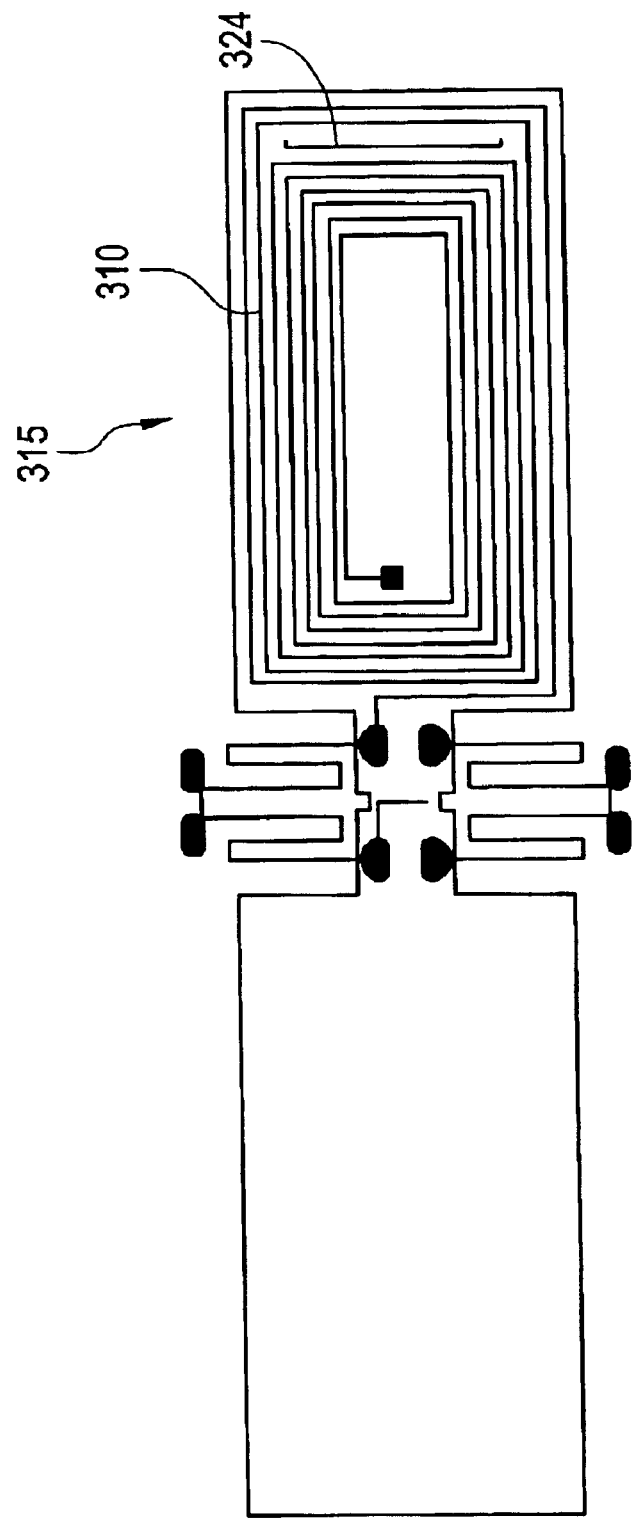
FIG. 6 is a top view of FIG. 3 showing major axis coils on one side of the pixel in accordance with a preferred embodiment of the present invention.
Figure 7:
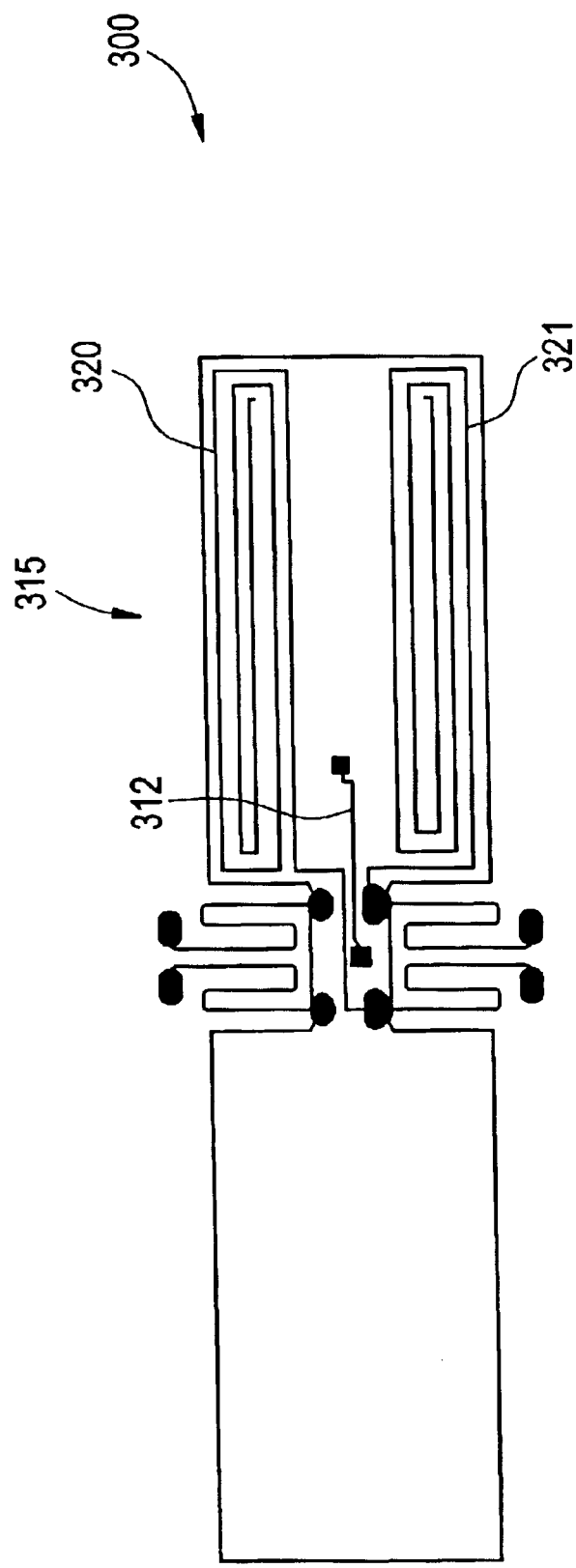
FIG. 7 is a top view of FIG. 3 showing minor axis coils on one side of the pixel in accordance with a preferred embodiment of the present invention.

An alternate preferred embodiment of the present invention would only have coils on one or the other of the two paddles 315 and 316 of FIG. 3. Such an embodiment would include the combination of one coil 310 in paddle 315 for the major axis 330 of rotation, as shown in FIG. 6, and two coils 320 and 321 in paddle 315 for the minor axis 340 of rotation, as shown in FIG. 7.

The advantage of such a "one-sided" design would be the reduction of the stress on one of the paddles, in this case paddle 316, which would increase the radius of curvature of a mirror placed on that paddle.

Figure 8:
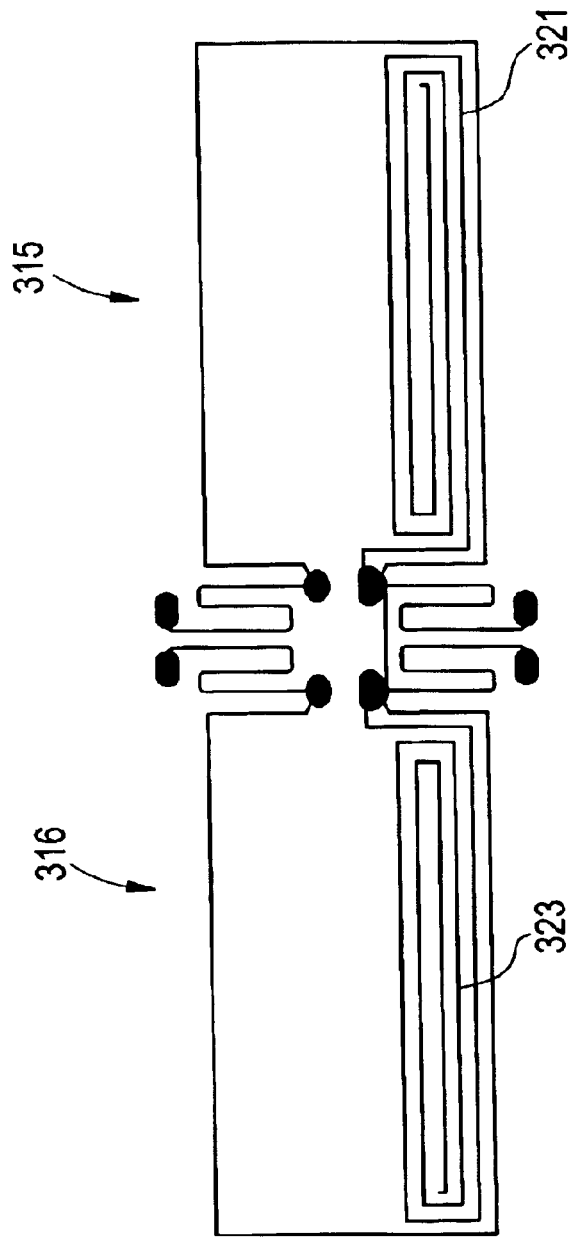
FIG. 8 is a top view of FIG. 3 showing minor axis coils on one side of the paddles in accordance with a preferred embodiment of the present invention.

Another preferred embodiment of the present invention would have just one or two of the four coils 320–323 of FIG. 5 for the minor axis. This embodiment is shown in FIG. 8 (showing two coils) and FIG. 9 (showing one coil).

It should be noted that several of the embodiments shown in the thus far described drawings might be combined into alternate preferred embodiments of the present invention. For instance, the elements shown in the embodiments of FIGS. 5 and 6 or FIGS. 6 and 8 may be combined to form an alternate preferred embodiment; the elements shown in the embodiments of FIGS. 6 and 9 may be combined to form another alternate preferred embodiment; the elements shown in the embodiments of FIGS. 6, 7, and 8 could also be combined to form yet another alternate preferred embodiment. FIG. 4 and FIG. 7 can also be combined to form another embodiment with two major coils and two minor coils. These various embodiments do not represent all possible contemplated alternate preferred embodiments in accordance with the present invention but rather by starting such a list of permutations it is meant to show the broad scope possible allowed within the present invention.

Figure 9:
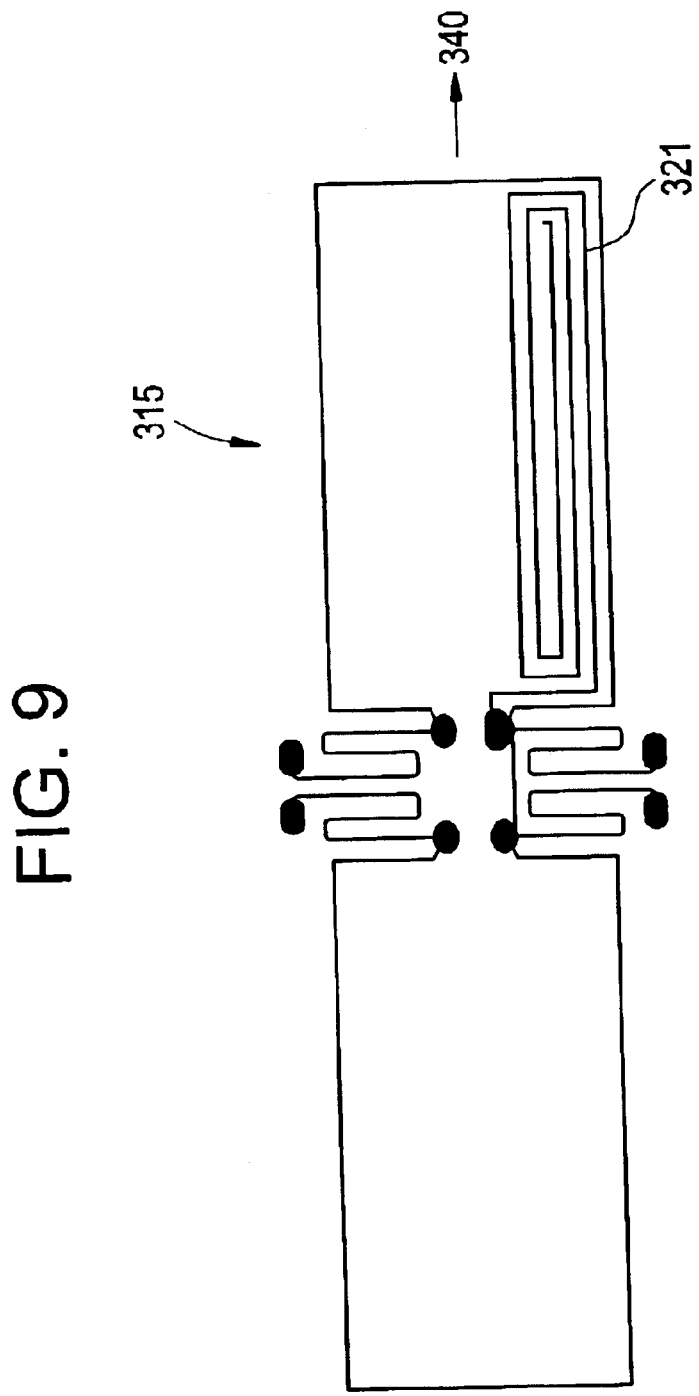
FIG. 9 is a top view of a MEMS mirror pixel with one coil for rotation about the minor axis in accordance with a preferred embodiment of the present invention.

In accordance with the present invention, the one coil 321 shown in FIG. 9 could be positioned in any one of the positions of the minor-axis coils shown in FIG. 5 and it would be possible to achieve some level of minor-axis rotation along minor axis 340 and/or major axis 330. Likewise, the exact shape and number of turns or layers of the coils could be altered according to design needs without departing from the scope of the present invention. For instance, two layers of metal could be used to define the major axis of rotation 330, and two additional metal layers, bringing the total to four metal layers could be used to form the minor axis of rotation coils. All such embodiments and variations or possible permutations are contemplated in the instant invention.

The coils on the pixels interact with a magnetic field provided by a set of permanent magnets to cause actuation.

Figure 10:
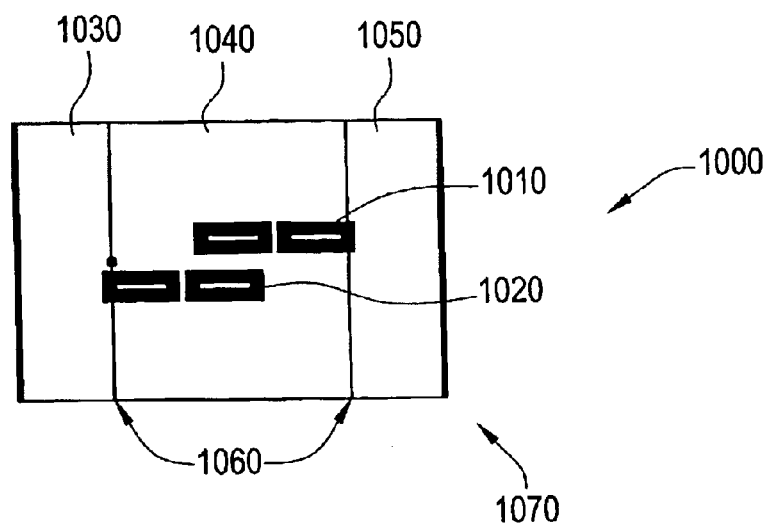
FIG. 10 is a top view of mirror pixels over a magnet array in accordance with a preferred embodiment of the present invention.

Referring now to FIG. 10, two mirror pixels 1010 and 1020 are shown from a top view 1000 over three magnets 1030, 1040, and 1050, where the magnets 1030, 1040, and 1050 may be extended (forming a magnet array 1070) in the direction of increasing number of mirrors. The magnets 1030, 1040, and 1050 alternate in magnetization (out of and in to the page), i.e. north, south, north; or south, north, south.

Figure 11:
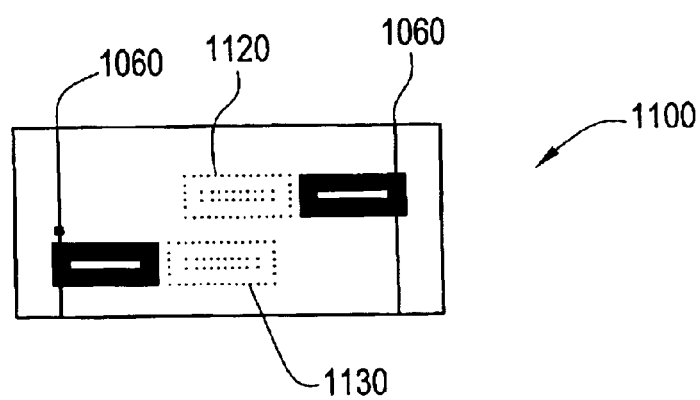
FIG. 11 is a top view of mirror pixels over a magnet array in accordance with a preferred embodiment of the present invention.

For the case where coils are placed on only one of the two paddles of the major axis of rotation, preferably the paddle closest to the North-South magnet boundary or edge 1060 in FIG. 10, FIG. 11 shows a top view of two mirror pixels 1100 where the removed coils 1120 and 1130 are indicated with a dotted boundary. The paddles with removed coils 1120 and 1130 may have a reflective mirror surface deposited therein. Such an embodiment produces an array of mirrors with high linear fill factor and high radius of curvature. For clarity, only the coils for the major axis of rotation are shown in FIG. 11.

Figure 12:
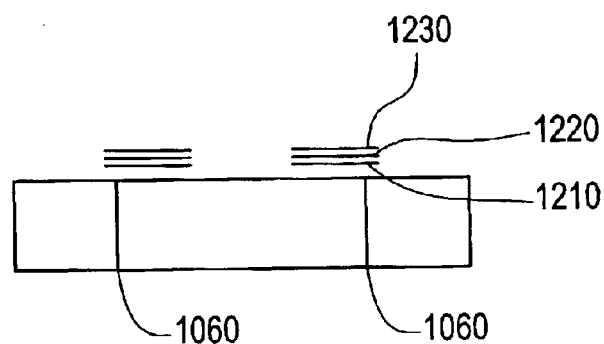
FIG. 12 is a side view of mirror pixels over a magnet array at three heights in accordance with a preferred embodiment of the present invention.

A side view of the two mirror pixels shown in FIGS. 10 and 11 is provided in FIG. 12 in accordance with a preferred embodiment of the present invention. The mirror pixels in FIG. 12 are shown at three heights 1210, 1220 and 1230 over the magnets (removed coils 1120 and 1130 in the mirror region, not shown). As such, this type of configuration would depict coils on one-side of the pixel. There is an increase in torque per mA at smaller gaps or as the distance between the coil and the magnet is decreased.

Still another preferred embodiment of the present invention uses electrostatic actuation for one of the two axes of rotation and electromagnetic for the other axis of rotation. Such a device could use a at least one patterned electrode structure on a magnet array and ground the moving paddles to achieve the desired electrostatic actuation. The ground may be formed on the moving paddle by connecting one of the coil leads to the double paddle structure. Such an embodiment may only require two electrical connections to the movable pixel, in general fewer connections than the aforementioned electromagnetic dual-axis rotation embodiments.

Figure 13:
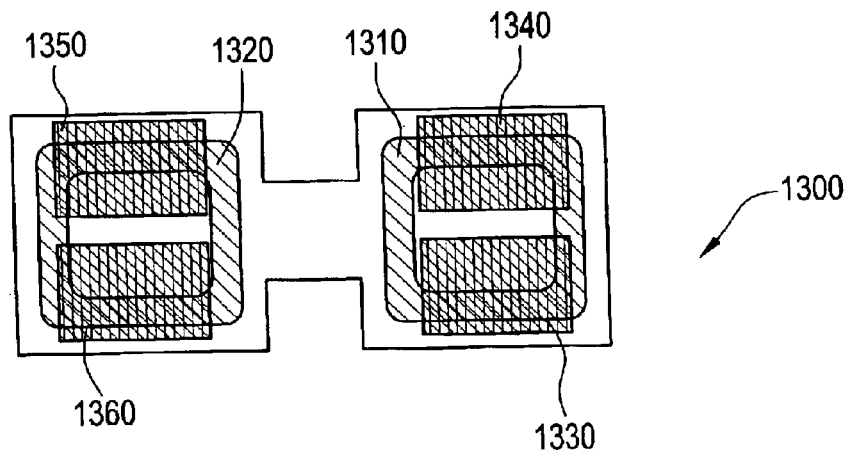
FIG. 13 is a top view of a mirror pixel device having electromagnetic major axis actuation and electrostatic minor axis actuation in accordance with a preferred embodiment of the present invention.

Referring now to FIG. 13 a top view schematic representation of a mirror pixel device 1300 with coils 1310 and 1320 is provided for electromagnetic primary axis actuation and electrostatic secondary actuation in accordance with a preferred embodiment of the present invention. Electrodes 1330–1360 are shown as four pads. Flexures, though not shown, are also present in the preferred embodiment of the present invention. Alternatively, instead of four pads, these electrodes 1330–1360 may be represented as one common ground plane as discussed supra on the pixel 1300 as shown in a preferred embodiment of the present invention in FIG. 14 infra.

Figure 14:
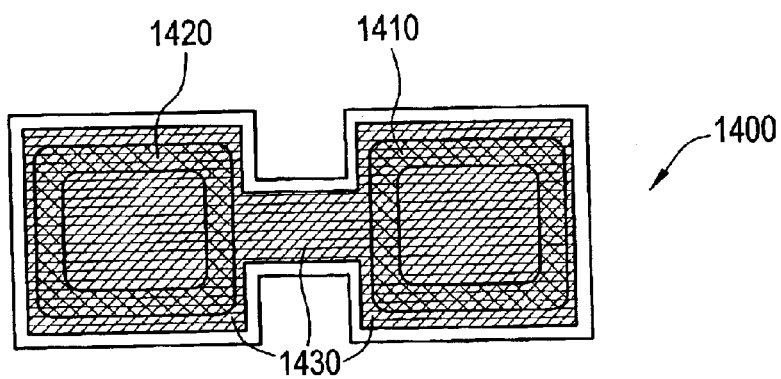
FIG. 14 is a top view showing a common ground plane in accordance with a preferred embodiment of the present invention.

Referring now to FIG. 14 a top view schematic representation of a mirror pixel device 1400 is shown having coils 1410 and 1420 and a common ground plane or electrode 1430 (where for instance, electrodes 1330–1360 of FIG. 13 are connected) providing electromagnetic primary axis actuation and electrostatic secondary actuation in accordance with a preferred embodiment of the present invention.

If a common ground electrode 1430 is designed on the pixel 1400, patterned electrodes may also be made on the magnet (FIG. 16) or an interposer (e.g. 1920 shown in FIG. 19) may be placed between the magnet and pixel 1400 in accordance with a further aspect of the preferred embodiment of the present invention. These patterned electrodes would be similar to electrodes 1330–1360 except that they would be on the magnet or interposer. One method to pattern the magnets in accordance within one aspect of a preferred embodiment of the present invention, is to coat the magnets with dielectric material, including but not limited to a polyimide material, and then patterning electrical lines directly on the polyimide material. A potential disadvantage of this method may be that the polymer material curing process may require the magnets to be re-magnetized after this process is complete.

Figure 15:
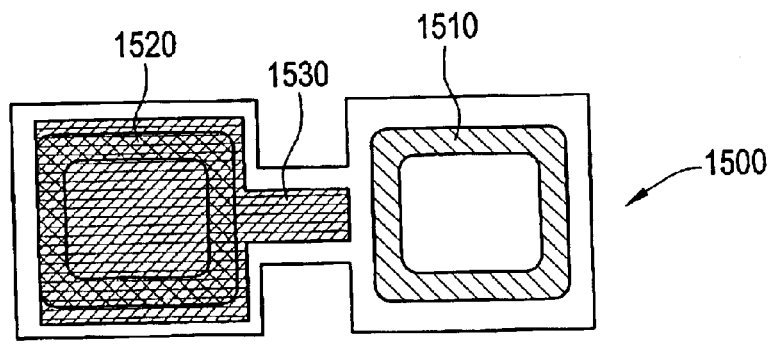
FIG. 15 is a top view showing an alternate common ground plane in accordance with another preferred embodiment of the present invention.

FIG. 15 shows a top view schematic representation of a mirror pixel 1500 an alternate preferred embodiment of the present invention with a common ground plane or electrode 1530 in one half of the paddle with coils 1510 and 1520 providing electromagnetic primary axis actuation and electrostatic secondary actuation in accordance with a preferred embodiment of the present invention. Such an embodiment may allow the paddle under coil 1510 to achieve higher radius of curvature. It should also be noted that coil 1510 may entirely be removed in accordance with the present invention thereby further increasing the radius of curvature.

Referring now to FIG. 16 a side view schematic of a mirror pixel 1600 of a preferred embodiment of the present invention having an interlayer dielectric 1610 on the movable pixel is shown. The dielectric layer 1610 may be made from materials including but not limited to, for example, polyimide, silicon dioxide, silicon nitride, or other dielectric layer materials.

The pads 1640 and 1650 shown in FIG. 16 for electrostatic actuation may be patterned on the magnetic material 1030, 1040, 1050. If the magnetic material is electrically conductive, an interlayer dielectric may be utilized (not shown in FIG. 16) between the electrostatic pads or patterned electrodes 1640 and 1650 and the magnetic material 1030, 1040, and 1050. Electrodes 1630 and 1660 are not shown, as they would be behind 1640 and 1650, respectively.

As previously described the four electrodes 1330–1360 on the pixel in FIG. 13 and hence electrodes shown in FIGS. 16 may be changed to a common ground plane where a separate set of electrodes is patterned on the magnets, or some form of interposer is utilized in accordance with another aspect of a preferred embodiment of the present invention as will be discussed in conjunction with FIG. 19.

Referring then to FIG. 17, a side view schematic of a mirror pixel 1700 of an alternate preferred embodiment of the present invention is provided where the electrostatic actuation is shown as being only on one side of the pixel via electrodes 1640, 1650 (removed) and common ground plane or electrode 1725 on the mirror. It should be noted that it might be desirable to remove coil 1310 and dielectric 1610 in the area of coil 1310 to achieve high radius of curvature. Still further, while two coils 1310 and 1320 are shown in FIG. 17, in accordance with yet another aspect of a preferred embodiment of the present invention, any one coil on any one paddle may be utilized without the need for a second coil.

Referring now to FIG. 18 a top view 1800 of mirror pixel array 1820 positioned over magnet array 1070 in accordance with yet another aspect of the preferred embodiment of the present invention is provided showing how the electrodes 1630 and 1640 of FIG. 17 (1630 not visible in FIG. 17 as it is behind 1640), for instance, associated with the electrostatic actuation could be positioned in an array. This type of embodiment is desirable for reducing the cross-talk of adjacent devices as the alternating nature of adjacent mirrors increases the physical distance between any two electrostatic pads 1640 and 1630 on adjacent pixels. The alternating or staggered nature of the electrostatic pads increases the distance between pads on neighboring pixels thereby reducing cross-talk. The one-sided, staggered configuration may be applied to the minor-axis electromagnetic actuation described supra. These embodiments have the advantage of reducing cross-talk and achieving high radius of curvature.

Figure 19:
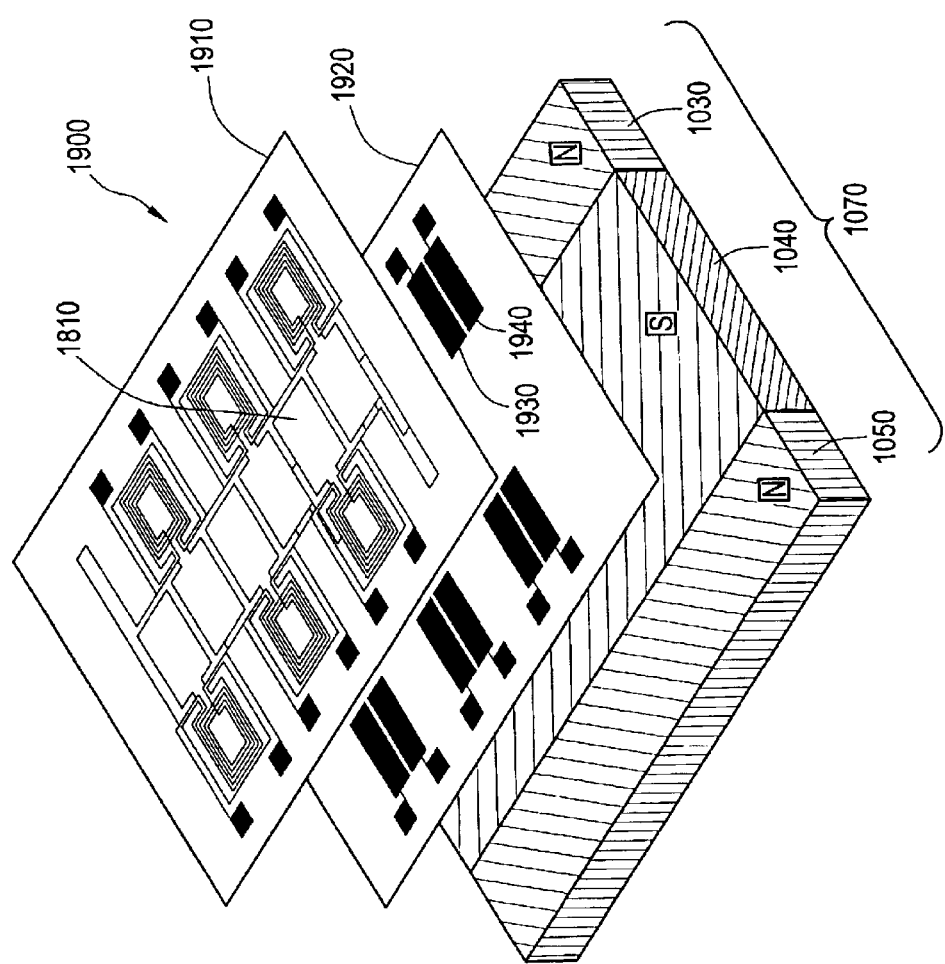
FIG. 19 is a perspective view of FIG. 18 showing an interposer in accordance with a preferred embodiment of the present invention.

Referring now to FIG. 19 a perspective view schematic 1900 of a mirror pixel array 1910 of an alternate preferred embodiment of the present invention is shown providing a ground plane having an interposer 1920 situated above a magnet array 1070. Note that, while present, the electrodes on the movable pixel array 1910 are not shown in FIG. 19 for clarity. The interposer 1920 is preferably made of pyrex. Conductive pads or patterned electrodes 1930 and 1940, made from gold for example, are also shown deposited on interposer 1920. As can be seen clearly in both arrays of FIGS. 18 and 19, a center array of mirrors 1810 is shown having neither coils nor electrodes. With such an embodiment, as discussed above in conjunction with FIG. 17, undesirable cross-talk is reduced.

Additionally, the electrodes described in conjunction with the embodiments of the present invention may be utilized for the purpose of sensing rotation about one or both axes by measuring the capacitance between the electrodes and the mirror pixel. In one aspect of the present invention for measuring minor axis rotation, the electrostatic pads on the interposer 1920 in FIG. 19 could be utilized to measure the differential capacitance for minor axis rotation.

In the case of an optical system for wavelength switching, as described supra, the minor axis rotation is used to compensate for small variations in wafer curvature, or any pointing accuracy issues that arise as a result of the fabrication of the device. An additional advantage of the minor axis rotation of the present invention as mentioned supra is that optical cross-talk during switching can be virtually eliminated. By actuating the minor axis during switching, the input beams can be decoupled from the output channels.

It would be obvious to one skilled in the art that the positions of the coils and electrodes could be changed, and that the number and size of the coils and/or electrodes could be altered subject to particular design considerations and desires. There are other variations of flexure and coil design not shown that would result in the same actuation principles as described by the present invention. However, it is intended, that all such potential variations or permutations fall within the scope of and would be motivated by the novel notions described in conjunction with the preferred embodiments of the present invention.

Several commercial applications are contemplated for the preferred embodiments of the present invention. Electromagnetic actuators may be useful in fluid control applications; for instance, actuators for valves. Also, as mentioned supra, a MEMS based wavelength optical switch or a MEMS based channel gain equalizer would also benefit from electromagnetic actuation based on dual-axis rotation and high fill factor mirrors.

Therefore, having described various preferred embodiments of the present invention, it will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A mirror device for obtaining dual axis rotation comprising:

first means for electromagnetic actuation about a first axis;

second means, for actuation about a second axis wherein said first and second means for actuation do not utilize a gimbal structure, wherein said first means for electromagnetic actuation utilizes at least one first coil and wherein said second means for actuation is electromagnetic actuation utilizing at least one second coil, wherein at least one permanent magnet provides a magnetic field to actuate said coils; and wherein an array formed of said mirror devices with said first and second means for electromagnetic actuation provides a linear fill factor greater than 80%.

2. The mirror device of claim 1 wherein said at least one first coil and at least one second coil can be positioned anywhere relative to each other on any side of said first and second axes.

3. The mirror device of claim 1 wherein said at least one first means coil is positioned only on one side of said first axis.

4. The mirror device of claim 3 wherein said at least one second means coil is positioned on the same side of said first axis as said at least one first means coil.

5. The mirror device of claim 1 wherein only said at least one second coil is present.

6. The mirror device of claim 1 wherein an array of magnets of alternating polarity is arranged to provide a magnetic field for said array of said mirror devices.

7. The mirror device of claim 6 wherein an array of center mirrors of said mirror device array has no coils.

8. The mirror device of claim 1 wherein said mirror device has a double paddle structure.

9. A mirror device for obtaining dual axis rotation comprising:

first means for electromagnetic actuation about a first axis;

second means for electrostatic actuation about a second axis wherein said first and second means for actuation do not utilize a gimbal structure, wherein said first means for electromagnetic actuation utilizes at least one first coil; and wherein an array formed of said mirror devices with said first and second means for actuation provides a linear fill factor greater than 80%.

10. The mirror device of claim 9 wherein said second means for electrostatic actuation utilizes at least one electrode.

11. The mirror device of claim 10 wherein said at least one first coil and said at least one electrode can be positioned anywhere relative to each other on either side of said first and second axes.

12. The mirror device of claim 10 wherein said at least one electrode is positioned only on one side of said first axis.

13. The mirror device of claim 12 wherein said at least one coil is positioned on the same side of said first axis as said at least one electrode.

14. The mirror device of claim 10 wherein said at least one electrode is positioned only on one side of said second axis.

15. The mirror device of claim 10 wherein said second means for electrostatic actuation utilizes a common ground plane.

16. The mirror device of claim 10 wherein said second means for electrostatic actuation utilizes an interposer.

17. The mirror device of claim 16 wherein said at least one electrode is used to sense rotation about at least one of said axes.

18. The mirror device of claim 17 wherein a plurality of electrodes on said interposer is used to measure differential capacitance for said second axis rotation.

19. The mirror device of claim 10 wherein said second means for electrostatic actuation utilizes at least one patterned electrode.

20. The mirror device of claim 10 wherein said at least one electrode is used to sense rotation about at least one of said axes.

21. The mirror device of claim 20 wherein a plurality of electrodes is used to measure differential capacitance for said second axis rotation.

22. The mirror device of claim 9 wherein at least one permanent magnet provides a magnetic field to actuate said at least one coil.

23. The mirror device of claim 9 wherein an array of magnets of alternating polarity is arranged to provide a magnetic field for said array of said mirror devices.

24. The mirror device of claim 23 wherein an array of center mirrors of said mirror device array have no coils or electrodes.

25. A mirror device for obtaining dual axis rotation comprising:

first means for electromagnetic actuation about a first axis;

second means, coupled to said first axis, for electrostatic actuation about a second axis wherein said first means for electromagnetic actuation utilizes at least one coil; and wherein an array of devices with said first means for electromagnetic actuation and said second means for electrostatic actuation allows a linear fill factor greater than 80%.

26. The mirror device of claim 25 wherein at least one permanent magnet provides a magnetic field to actuate said at least one coil.

27. The mirror device of claim 25 wherein said second means for electrostatic actuation utilizes at least one electrode.

28. The mirror device of claim 27 wherein said at least one electrode is used to sense rotation about at least one of said axes.

29. The mirror device of claim 28 wherein a plurality of electrodes are used to measure differential capacitance for second axis rotation.

30. The mirror device of claim 25 wherein said second means for electrostatic actuation utilizes a common ground plane.

31. The mirror device of claim 25 wherein said second means for electrostatic actuation utilizes an interposer.

32. The mirror device of claim 31 wherein said at least one electrode is used to sense rotation about at least one of said axes.

33. The mirror device of claim 32 wherein a plurality of electrodes on the interposer are used to measure differential capacitance for second axis rotation.

34. The mirror device of claim 25 wherein said second means for electrostatic actuation utilizes at least one patterned electrode.

35. The mirror device of claim 25 wherein an array of magnets of alternating polarity is arranged to provide a magnetic field for said array of said mirror devices.

36. The mirror device of claim 35 wherein an array of center mirrors of said mirror device array have no coils or electrodes.

37. The mirror device of claim 25 wherein said mirror device has a double paddle structure.

38. An array of MEMS devices, each device comprising:

a mirror with a reflective surface having no gimbal support;

at least one first coil for causing selective movement of said mirror about a first axis in the presence of a magnetic field;

means for causing selective movement of said mirror about a second axis wherein said means for causing selective movement utilizes at least one second coil in the presence of a magnetic field; and wherein said array of devices allows a linear fill factor greater than 80%.

39. The array of claim 38 wherein said at least one first coil can be positioned in any position on each side of said first axis.

40. The array of claim 38 wherein said at least one first coil is positioned only on one side of said first axis.

41. The array of claim 38 wherein said at least one second coil can be positioned in any position on each side of said second axis.

42. The array of claim 38 wherein said at least one first and second coils are superposed on said mirror.

43. The array of claim 38 wherein said at least one first and second coils are not superposed on said mirror.

44. The array of claim 38 wherein an array of magnets of alternating polarity is arranged to provide said magnetic field for said array.

45. The of claim 38 wherein an array of center mirrors of said mirror array has no coils.

46. The array of claim 38 wherein said means for causing selective movement utilizes at least one electrode.

47. The array of claim 46 wherein said at least one coil and said at least one electrode can be positioned anywhere relative to each other on either side of said first and second axes.

48. The array of claim 46 wherein said at least one electrode is positioned only on one side of said first axis.

49. The array of claim 48 wherein said at least one coil is positioned on the same side of said first axis as said at least one electrode.

50. The array of claim 46 wherein said at least one electrode is positioned only on side of said second axis.

51. The array of claim 46 wherein said means for causing selective movement utilizes a common ground plane.

52. The array of claim 46 wherein said means for causing selective movement utilizes an interposer.

53. The array of claim 46 wherein said means for causing selective movement utilizes at least one patterned electrode.

54. The array of claim 46 wherein said array of devices allows a linear fill factor greater than 80%.

55. The array of claim 46 wherein an array of magnets of alternating polarity is arranged to provide said magnetic field for said array.

56. The array of claim 46 wherein an array of center mirrors of said mirror array has no coils or electrodes.

57. The array of claim 46 wherein said at least one electrode is used to sense rotation about at least one of said axes.

58. The array of claim 46 wherein a plurality of electrodes is used to measure differential capacitance for said second axis movement.

59. The mirror device of claim 38 wherein said mirror device has a double paddle structure.

60. An array of electromagnetically actuated MEMS devices, each device comprising:
   a mirror with a reflective surface having no gimbal structure support;
   at least one minor axis coil for causing selective movement of said mirror about said minor axis in the presence of a magnetic field; and
   wherein said array of mirror devices allows a linear fill factor greater than 80%.

61. The array of claim 60 wherein said minor axis coil produces dual axis rotation of said mirror.

* * * * *